May 20, 1958     A. F. HARDMAN     2,834,991
METHOD OF PREPARING COMPOUNDING INGREDIENTS FOR RUBBER
Filed Jan. 15, 1954
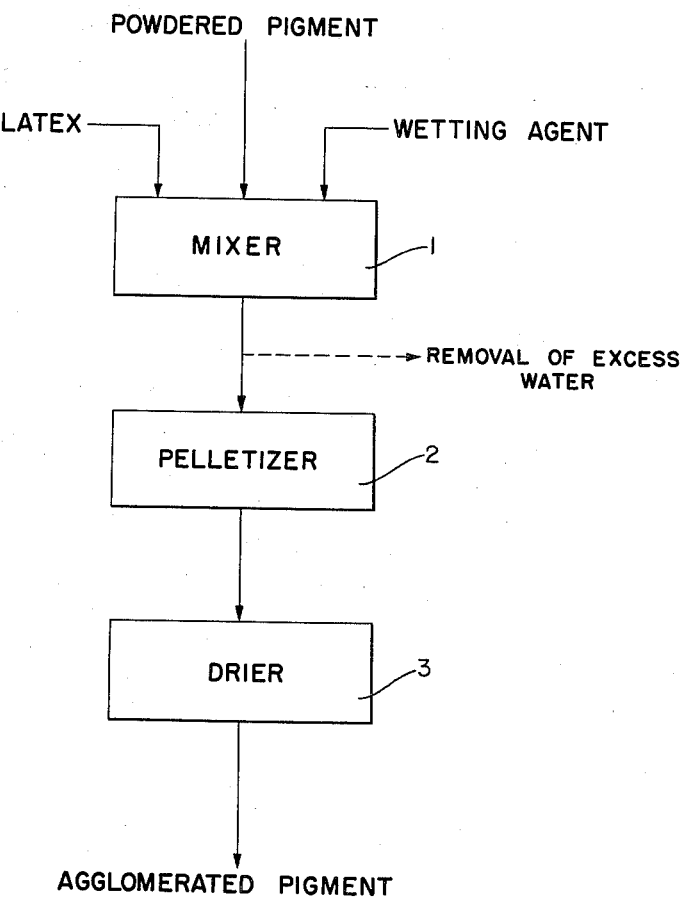
INVENTOR.
ALBERT F. HARDMAN
BY
ATTORNEY United States Patent Office 2,834,991
Patented May 20, 1958

2,834,991

METHOD OF PREPARING COMPOUNDING INGREDIENTS FOR RUBBER

Albert F. Hardman, Akron, Ohio, assignor to The Goodyear Tire & Rubber Company, Akron, Ohio, a corporation of Ohio Application January 15, 1954, Serial No. 404,395

5 Claims. (Cl. 18—47.5)

This invention relates to a method for preparing powdered compounding ingredients for rubber in a novel and more useful form. More specifically, the invention relates to a method for eliminating certain health hazards and handling problems involved in the use of finely powdered ingredients in rubber composition.

This application is a continuation in part of copending application Serial Number 95,153, filed May 24, 1949, now abandoned.

Because of the required use of finely powdered organic ingredients in the compounding of natural and synthetic rubber certain problems develop for the rubber goods manufacturer. For example, in normal production operations, there may be a substantial loss of particles which are light enough to be blown into the surrounding air. Such losses, due to the high price of many of the materials involved, represent a substantial increase in cost of production. In addition, the presence of these tiny dust particles in the air surrounding production operations results in the contamination of other materials. Such contamination is a constant source of annoyance to the rubber goods manufacturer. Then too, certain of the powders used in the compounding of natural and synthetic rubbers create serious health hazards because of their tendency to be blown into the surrounding air, causing irritation to the mucous membranes in the mouths and nasal passages of the workmen who must breathe the contaminated air. The class of ingredients known as organic accelerators are particularly objectionable in this respect.

Efforts have been made to reduce these objectionable effects by converting these finely divided powders to an agglomerated form. Various methods of pelletizing powdered materials have been tried only to prove unsuccessful for one or more of several reasons, among which are the failure to overcome objectionable dusting, the development of static electrical charges on the pellet during processing operations, and the failure of the pellet, once formed, to break down and permit dispersion of the individual particles of material into the rubber during the milling operation. All of these objections have been overcome by preparing the powdered materials in an agglomerated form according to the methods of this invention.

One purpose of this invention is to provide for the preparation of powdered compounding ingredients for rubber in an agglomerated form which will substantially eliminate the tendency of such powdered materials to form dust and be blown into the surrounding air during storage, shipping, weighing, and processing operations. The use of these novel forms of compounding ingredients results in a material saving to the manufacturer, the elimination of one source of contamination, and the elimination of a health hazard to which workmen handling such materials are exposed.

Another purpose of this invention is to provide for the preparation of these materials in an agglomerated form of such a nature that the individual particles of the agglomerate will hold together during normal handling operations and yet will disperse readily into and through the rubber during the milling operation.

This invention is applicable to the preparation of pellets of any dry powdered material. Among the classes of materials to which the invention is particularly applicable in the rubber art are powdered organic compounding ingredients such as accelerators, antioxidants and coloring agents.

Illustrative of the rubber compounding ingredients to which this invention pertains are tetramethyl thiuram disulfide, tetraethyl thiuram disulfide, mercaptobenzothiazol, mercaptobenzothiazyl disulfide, zinc dimethyl dithiocarbamate, zinc dibutyl dithiocarbamate, copper diethyl dithiocarbamate, lead dimethyl dithiocarbamate, selenium dimethyl dithiocarbamate, selenium diethyl dithiocarbamate, phenyl beta naphthyl amine, diphenyl p-phenylene diamine, calcium carbonate, barium sulfate, clay, carbon black and other conventional rubber compounding ingredients. Obviously, a wide variety of other similar compounds may also be pelletized with comparable beneficial results.

In accordance with this invention, it has been found that the agglomerates of the powdered material can be prepared by mixing the powder, a binder for the individual particles thereof, which binder is compatible with the rubber in which the compounding ingredient is to be used, and a similarly compatible wetting agent which causes the particles to be coated by the binder and, in some cases, will prevent the generation of objectionable static electrical charges on the finished product. The mixing operation can be carried out in aqueous suspension, the consistency of which can vary from that of a thick paste to an aqueous slurry. After thorough mixing, as by stirring, any excess water is removed by filtration and drying until the water content is between about 20 percent and about 40 percent by weight of the total mixture. In this form, the mixture can be shaped in any kind of pellet-forming apparatus such as a molding press, corrugated rolls, or an extrusion mill.

The invention may be understood further with reference to the accompanying flow sheet which represents a preferred method of practicing the invention. The wetting agent, powdered pigment, and binder, such as a latex, are thoroughly mixed together in a mixer 1 after which excess water, if any, is removed and the paste-like mixture is processed through a pelletizer 2. The wet pelletized pigment is then passed into a dryer 3. After the removal of residual water, the desired agglomerated pigment is formed.

The purpose of the binder is to hold the individual particles of powder together in an agglomerate. It has been found that by mixing the accelerators with about one to ten percent of their weight (based on dry rubber content) of a rubber latex, including latices of any natural or synthetic rubber, firmly bonded pellets of the powder can be prepared which hold together during normal handling operations but which disperse readily into and through the rubber when the pellets are mixed with rubber during milling. In addition to natural rubber latex in its native state, deproteinized or concentrated natural latices and artificial latices made by re-dispersing solid rubber may also be used. Synthetic latices, including those of polychloroprene, polybutadiene, and copolymers of 40 to 80 percent of butadiene-1,3 and 20 to 60 percent of styrene, acrylonitrile or other mono-olefinic monomer are also useful. The preferred practice in accordance with this invention utilizes from 2 to 8 percent dry rubber content in latex form.

As stated, the wetting agent which is mixed with the powder and binder causes the individual powder particles to be coated by the binder. Certain wetting agents have the additional advantage of functioning as an inhibitor of static electrical charges which tend to form on the powdered particles during preparation. Examples of suitable wetting agents are any of the commercially available wetting agents such as those containing the alkali metal, ammonium, and amine salts of saturated or unsaturated fatty acids having from 12 to 24 carbon atoms. Other wetting agents which perform the dual function of wetting and of inhibiting the formation of static charges are the saturated or unsaturated fatty acids having from 12 to 24 carbon atoms. These wetting agents may be used alone or in combination. Specific examples of suitable wetting agents include oleic acid, stearic acid, sodium stearate, salts of ricinoleic acid, ammonium oleate, linoleic acid salts, triethanol amine oleate, lauric acid soaps, or mixtures of such compounds as usually occur in commercial soaps. The soap-type materials are preferred since they function both as wetting agent and static inhibitor. It has been found desirable to add from 0.5 percent to 5 percent by weight of these agents based upon the weight of the powder. Preferred practice utilizes from 1 to 3 percent of the wetting agent by weight.

The materials are conveniently mixed together in aqueous solution, the sequence of adding the materials not being important. The preferred method of mixing the materials is to form an aqueous emulsion of the binder and the wetting agent by mixing the materials at a temperature from about 100° F. to 150° F. When thoroughly mixed, this emulsion is added to and mixed with the dry powder until the water content of the resulting paste is between 25 and 35 percent by weight of the entire mass. In this form, the compounded paste can be passed through any type of pellet-forming machine.

It is preferred to form the agglomerates from the paste-like mixture by extruding the paste in the form of long rods or strings varying in diameter from $\frac{1}{16}$ to $\frac{5}{16}$ inch. The long rods or strings supported along their length are then dried. A convenient drying method is to collect the rods on a moving belt as the rods emerge from the extrusion press and to convey the rods, thus supported, through a drying oven. It is helpful to provide a moving belt which oscillates in the plane of conveyance so as to distribute the rods evenly and uniformly over the width of the belt. The oscillating belt is particularly useful if the rods emerge from the head of the extrusion press in more than one plane. The rods leaving the drying oven are then collected.

During the drying and cooling operations the long continuous lengths of extruded material break up into shorter discontinuous lengths varying in size from $\frac{1}{4}$ to $1\frac{1}{2}$ inches long. The short lengths produced by the drying and cooling operations are convenient for packaging and use. The nature of the extruded product is such that the long continuous lengths break up into shorter lengths merely by drying the extruded material while supporting it along its length. The resistance to movement over the supporting surface dependent upon the shrinking of the drying material, the movement of the belt upon which the lengths of material are dried and the removal of the dried lengths from the belt all contribute to the formation of the shorter length material. No positive cutting or severing action is required to form these short lengths of material as would be necessary if the amount of binder employed should be substantially in excess of the limits herein set forth. The collected rods are durable yet soft agglomerates, the particles of which are firmly bonded together by the binder and are at the same time capable of being broken apart on the mill to disperse readily into rubber during a subsequent milling operation.

Further details of the practice of this invention are set forth with respect to the following specific examples:

*Example 1*

The following compounds were mixed by hand stirring:

712.5 grams tetramethylthiuram disulfide 150 grams 10% aqueous solution of triethanol amine-oleate 155 cc. water 90 grams latex of the copolymer of 70% butadiene and 30% styrene (24.7% solids)

The liquids were added to the dry accelerator and mixed until the composition was uniform. It was then passed through a meat grinder which produced long strings or rods of the compounded accelerator. After air-drying, the compound was in the form of short rod-like shapes quite free from dust which were soft enough to mix easily into rubber on a roll mill.

*Example 2*

A sample of 8.5 grams of a latex of a copolymer of 70% butadiene and 30% styrene (24.7% solids) and 30 grams of a 10% aqueous solution of sodium oleate were mixed and diluted with three volumes of water. It was then added slowly with rapid stirring to 1311 grams of an aqueous suspension containing 7.8% of tetramethylthiuram disulfide and 0.25% sulfuric acid. The resultant suspension was filtered on a Buchner funnel, washed, and pressed as dry as possible. The moist filter cake was then passed through a meat grinder and the extruded product dried. The pelletized accelerator so prepared was well formed and dispersed readily on a roll mill with commercial synthetic rubber.

*Example 3*

A 40 gram portion of a 5% aqueous triethanolamine stearate solution was diluted with 15 cc. of water and then thoroughly mixed with 36 grams of a 22.3% solids latex of a copolymer of 70% butadiene and 30% styrene. After a uniform mixture was attained, 90 grams of benzothiazyl disulfide were added. The thick pasty mass so obtained was extruded from a meat grinder and dried in the air at room temperature. The pellets were firmly adherent yet soft enough to mix easily with rubber on a roll mill.

While certain representative embodiments and details have been shown for the purpose of illustrating the invention, it will be apparent to those skilled in this art that various changes and modifications may be made therein without departing from the spirit or scope of the invention.

I claim:

1. The method of preparing a pulverulent compounding ingredient for rubber which comprises mixing in an aqueous solution containing a solids content of between 60 and 80% by weight of the total mass, a powdered material with from 1 to 10% by weight of said powdered material of a latex, extruding the mixture as continuous strings or rods ranging in diameter from $\frac{1}{16}$ to $\frac{5}{16}$ inch, removing moisture from said continuous rods or strings while supporting the same along their length to dry the strings or rods and simultaneously reduce the continuous strings or rods to discontinuous lengths and collecting the discontinuous strings or rods in lengths varying from $\frac{1}{4}$ to $1\frac{1}{2}$ inches.

2. The method of preparing pulverulent compounding ingredients for rubber which comprises mixing, in an aqueous solution containing a solids content of between 60 and 80% by weight of the total mass, a powdered material with a latex and a wetting agent compatible with rubber, the solids content of said latex being from 1 to 10% by weight of said powdered material, forming agglomerates of powdered material held together by the solids content of said latex by extruding the mixture in the form of long strings or rods ranging in diameter from $\frac{1}{16}$ to $\frac{5}{16}$ inch onto a support, drying the thus supported rods or strings to remove the moisture and cause the strings or rods to break into agglomerates varying in length from $\frac{1}{4}$ to $1\frac{1}{2}$ inches and collecting the agglomerates.

3. The method of preparing pulverulent compounding ingredients for rubber which comprises adding an aqueous solution of a latex to a dried powdered material, said latex being used in an amount that the rubber content ranges from 1 to 10% by weight of said dry powdered material, forming a paste of the mixture containing water in an amount from 20 to 40% by weight of the total mass, extruding the mixture in the form of long strings or rods ranging in diameter from 1/16 to 5/16 inch onto a support, drying the thus supported strings or rods to remove the moisture and cause the strings or rods to break into agglomerates varying in length from 1/4 to 1½ inches and collecting the agglomerates.

4. The method of preparing a pulverulent compounding ingredient for rubber which comprises mixing a dry powdered material with a latex and a wetting agent compatible with rubber, the solids content of said latex being from 1 to 10% by weight of said powdered material and the total solids content of the mixture being between 60 and 80 percent by weight of the total mass, forming agglomerates of the powdered material held together by the solids content of said latex by extruding the mixture to form long strings or rods ranging in diameter from 1/16 to 5/16 inch onto a support, drying the thus supported strings or rods to remove the moisture and cause the strings or rods to break into agglomerates varying in length from 1/4 to 1½ inches and collecting the agglomerates.

5. The method of preparing a pulverulent compounding ingredient for rubber which comprises mixing, in an aqueous solution containing a solids content of between 60 and 80% by weight of the total mass, a powdered material with from 1 to 10% by weight of said powdered material of the rubber content of a latex, extruding the mixture as continuous strings or rods ranging in diameter from 1/16 to 5/16 inch onto a support, causing the strings or rods to be reduced to agglomerates varying in length from 1/4 to 1½ inch by drying the supported strings or rods and collecting the agglomerates.

References Cited in the file of this patent

UNITED STATES PATENTS

| | | |
|---|---|---|
| 2,348,847 | Pike | May 16, 1944 |
| 2,457,962 | Whaley | Jan. 4, 1949 |
| 2,457,963 | Thodos | Jan. 4, 1949 |
| 2,459,745 | Waters | Jan. 18, 1949 |
| 2,538,809 | Te Grotenhuis | Jan. 23, 1951 |
| 2,605,255 | Nadler | July 29, 1952 |
| 2,641,044 | Beaver | June 9, 1953 |

OTHER REFERENCES (Abstract) Amon, 556,493, Nov. 7, 1950.